United States Patent [19]

Touma et al.

[11] Patent Number: 4,882,593

[45] Date of Patent: Nov. 21, 1989

[54] METHOD AND APPARATUS FOR CARRYING OUT TRANSFERENCE RECORDING OF AN INK IMAGE

[75] Inventors: Kouichi Touma, Kawasaki; Tetsuo Hasegawa, Tokyo; Naoki Kushida, Yokohama; Hisao Yaegashi; Yasuyuki Tamura, both of Yokohama; Shuzo Kaneko, Tokyo, all of Japan

[73] Assignee: Canon Kabushiki Kaisha, Tokyo, Japan

[21] Appl. No.: 942,810

[22] Filed: Dec. 22, 1986

[30] Foreign Application Priority Data

| | | | |
|---|---|---|---|
| Dec. 23, 1985 | [JP] | Japan | 60-287840 |
| Dec. 23, 1985 | [JP] | Japan | 60-287841 |

[51] Int. Cl.$^4$ .......................... G01D 15/10; B41J 3/20

[52] U.S. Cl. ................................ 346/111; 346/76 PH; 400/120; 400/198; 400/202.4; 400/662

[58] Field of Search .................... 346/76 PH; 400/120, 400/202.4, 198, 241.1, 662; 430/348; 428/913, 945

[56] References Cited

U.S. PATENT DOCUMENTS

| | | | |
|---|---|---|---|
| 4,453,839 | 6/1984 | Findlay et al. | 400/120 |
| 4,462,035 | 7/1984 | Koto | 346/76 PH |
| 4,514,744 | 4/1985 | Saiton et al. | 346/153.1 X |
| 4,580,142 | 4/1986 | Matsushita et al. | 346/1.1 |
| 4,743,920 | 5/1988 | Tohma et al. | 346/1.1 |

FOREIGN PATENT DOCUMENTS

| | | |
|---|---|---|
| 41-17337 | 2/1966 | Japan . |
| 54-161946 | 12/1979 | Japan . |
| 56-28873 | 3/1981 | Japan . |
| 56-63477 | 5/1981 | Japan . |
| 57-151375 | 9/1982 | Japan . |
| 58-12790 | 1/1983 | Japan . |
| 58-78782 | 5/1983 | Japan . |
| 58-220795 | 12/1983 | Japan . |

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

Image recording is indirectly achieved on a recording sheet via an intermediate transferring medium. First, the circumferential surface of a rotatable transferring medium having heat-transferable ink contained therein is fused or softened in response to image information by means of a recording electrode which is disposed at the position opposite to the transferring medium while the intermediate transferring medium is interposed therebetween. After completion of the first transferring step the ink image which has been transferred onto the intermediate transferring medium is transported to the position where a second transferring step is achieved while the ink image is kept in the fused or softened state. The second transferring step is achieved in such a manner that the ink image is transferred onto the recording sheet under the effect of pressure which is imparted by a pressure roller. The intermediate transferring medium may be made of electric conductive material. Intermediate treatment such as removal of the ink image, partial correction of the same, addition of another ink image can be carried out between the first transferring step and second transferring step.

22 Claims, 4 Drawing Sheets

METHOD AND APPARATUS FOR CARRYING OUT TRANSFERENCE RECORDING OF AN INK IMAGE

BACKGROUND OF THE INVENTION

1. Field of the Invention

The present invention relates to a transference recording method which assures that a high quality image can be recorded even on a recording medium the surface of which has a lower degree of flatness. It relates also to an apparatus for practicing the aforesaid method.

2. Related Background Art

As is well known, a conventional heat sensitive recording method has generic advantageous features that an apparatus for practicing the method can be designed smaller and light in weight and so that it generates little noise. In addition, it has another advantageous feature that recording can be achieved on plain paper. Accordingly, it has been widely put in practical use in the recent years.

In general, the conventional heat sensitive recording method is practiced in such a manner that a heat resistant base film having heat-fusible ink coated thereon in the form of a thin layer is used as a transferring medium, a recording medium is superimposed on the ink layer of the transferring medium, the heat-fusible ink is fused to build an image pattern by heating from the base film side with an aid of a recording head adapted to generate heat in response to image information and the thus fused ink is then transferred onto the recording medium.

However, it has been pointed out as problems inherent to the conventional heat sensitive recording method that there is a necessity for an ink ribbon comprising a comparatively expensive heat resistant base film on which heat-fusible ink is coated by way of complicated steps and the ink ribbon cannot be repeatedly used after the ink is once transferred onto a recording medium, resulting in the running cost being increased. Another problem of the conventional heat sensitive recording method is that fused ink is not reliably transferred onto a recording medium when the latter does not have a flat surface, so there is a fear of causing failure of transference of a part of the ink image and therefore a recording medium usable for transference recording is limited only to a specific recording medium the surface of which has a high degree of flatness.

To reduce the running cost of an ink ribbon, there has been made a proposal that an endless belt shaped supporting medium is employed for the ink ribbon, a plurality of ink layers are placed on the supporting medium one above another by coating operation, one of the ink layers is transferred onto an intermediate transferring medium at every time when transference recording is effected and the thus transferred ink on the intermediate transferring medium is then retransferred onto a recording medium. However, the proposed recording method requires installation of a mechanism for coating the supporting medium with ink and this leads to a result that the whole apparatus for practicing the method becomes large and complicated. Another problems of the proposed recording method are that a transferred image having high resolvability cannot be obtained unless ink is reheated when it is retransferred onto the recording medium and moreover a satisfactorily high quality of image cannot be easily built on a recording medium when the surface of the latter has a lower degree of flatness.

SUMMARY OF THE INVENTION

Hence, the present invention has been made with the foregoing background in mind and its object resides in providing a method and an apparatus for carrying out transference recording of an ink image at a reduced running cost.

Other object of the present invention is to provide, a method and an apparatus of the above-mentioned type assuring that a high quality of recording can be achieved even when a recording medium with poor flatness is used.

Another object of the present invention is to provide a method and an apparatus of the above-mentioned type assuring that the apparatus for practicing the method can be designed and constructed in smaller dimensions.

To accomplish the above objects there is proposed according to one aspect of the present invention a method of recording an image on a recording medium by image transference comprising the steps of fusing or softening heat-transferable ink on a rotatable transferring medium, the heat-transferable ink being contained in the rotatable transferring medium, transferring the thus fused or softened heat-transferable ink onto an intermediate transferring medium to achieve a first transferring step, transferring onto the recording medium the heat-transferable ink which has been transferred onto the intermediate transferring medium to achieve a second transferring step, and flattening the circumferential surface of the rotatable transferring medium after completion of the first transferring step.

Further, there is proposed according to another aspect of the present invention an apparatus for recording an image on a recording medium by image transference comprising a rotatable transferring medium having heat-transferable ink contained therein, means for fusing or softening the heat-transferable ink in the rotatable transferring medium in response to image information, first transferring means for transferring the thus fused or softened heat-transferable ink onto an intermediate transferring medium, second transferring means for transferring onto the recording medium the heat-transferable ink which has been transferred onto the intermediate transferring medium, and flattening means for flattening the circumferential surface on the rotatable transferring medium after completion of transference onto the intermediate transferring medium.

In a preferred embodiment of the present invention the heat-transferable ink has a supercooling time in the range of 0.1 to 100 seconds.

Further, the heat-transferable ink has a melting point or softening point in the range of 40° to 200° C.

Other objects, features and advantages of the invention will become more apparent from reading of the following description which has been prepared in conjunction with the accompanying drawings.

BRIEF DESCRIPTION OF THE DRAWINGS

The accompanying drawings will be briefly described below.

DETAILED DESCRIPTION OF THE PREFERRED EMBODIMENTS

Now, the present invention will be described in more detail hereunder with reference to the accompanying drawings which illustrate preferred embodiments thereof.

Figure 1:
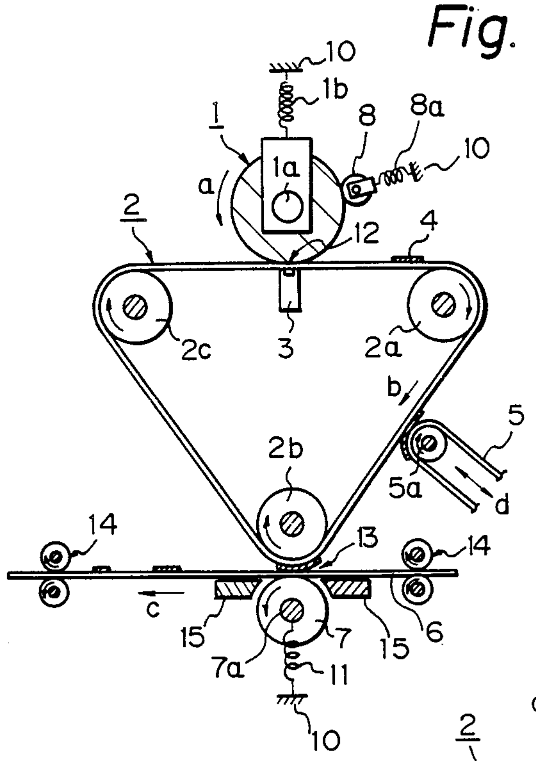
FIG. 1 is a schematic sectional view of an apparatus for practicing a method in accordance with an embodiment of the invention, particularly illustrating the structure for heating an ink roller by means of a recording head with an intermediate transferring medium interposed therebetween.

FIG. 1 is a fragmental schematic sectional view of an apparatus for effecting transfer recording in accordance with an embodiment of the invention for which an endless belt shaped intermediate transferring medium is used. In the drawing reference numeral 1 designates an ink roller adapted to serve as a transferring medium. Specifically, the ink roller 1 is constituted by solidified ink which has supercoolable heat-fusibility and it is disposed so as to rotate about shafts 1*a* which are projected outwardly of both the side walls thereof. Thus, it can be continuously or intermittently rotated in a direction as identified by an arrow mark a in the drawing in response to recording operation to be performed.

Reference numeral 2 designates an endless belt shaped intermediate transferring medium which is disposed at the side of the ink roller 1 adapted to be rotated in that way. As is apparent from the drawing, the intermediate transferring medium 2 is endlessly extended around three rollers 2*a*, 2*b* and 2*c* and comes in contact with a part of the circumferential surface of the ink roller so that it is circulated in a direction as identified by an arrow mark b in the drawing while it is kept in the contacted state as the ink roller 1 is rotated. When the circumferential surface of the ink roller 1 is heated in response to image information by means of a recording head 3 having a heating element (not shown) incorporated therein during rotation of the ink roller 1 in that way while the intermediate transferring medium 2 is interposed between the ink roller 1 and ( the recording head 3, the image information being transmitted from a control section (not shown), the heated part of the ink roller 1 is fused or softened and becomes tacky under the effect of heat transmitted from the recording head 3 whereby fused or softened ink of which shape corresponds to the pattern of an image relative to the image information is transferred onto the intermediate transferring medium 2 to build an ink image 4 thereon. Due to the fact that the ink image 4 is constituted by the supercoolable heat-fusible ink, it maintains the fused or softened state for a predetermined period of time after it is heated by the recording head 3 and it is transported in the direction as identified by the arrow mark b in the drawing as the intermediate transferring medium 2 is circulated.

During transportation of the ink image 4 in that way required various intermediate treatment can be imparted to the ink image 4 on the intermediate transferring medium 2. For instance, as shown in FIG. 1, the ink image 4 can be removed or partially modified by allowing an ink image removing sheet 5 made of absorptive material or the like to come in contact with the surface of the intermediate transferring medium 2 in the optimum manner. Owing to this an occurrence of incorrect recording on a recording sheet 6 can be prevented without fail. Alternatively, another ink roller may be additionally provided in the same manner as the foregoing one to achieve addition of an ink image.

As the intermediate transferring medium 2 is circulated, the recording sheet 6 serving as a recording medium is transported in a direction as identified by an arrow mark c in the drawing with an aid of pairs of transporting rollers 14 and a guide 15 and contact is established at a position between the intermediate. transferring medium 2 and a roller 2*b*. At this moment pressure is imparted to the area located between the roller 2*b* and a pressure roller 7 whereby the ink image 4 held on the intermediate transferring medium 2 in the supercooled state is transferred onto the recording sheet 6, resulting in image recording corresponding to the image information being achieved on the recording sheet 6. It should be noted that pressure appearing in the area between the roller 2*b* and the roller 7 is generated by means of a coil spring 11 which is disposed between a shaft 7*a* of the roller 7 and a housing 10 of the apparatus.

In the meanwhile, after completion of transference of ink onto the intermediate transferring medium 2 it will be found that the circumferential surface of the ink roller 1 becomes appreciably rugged. To compensate for this ruggedness a thermal flattening roller 8 adapted to come directly in contact with the circumferential surface of the ink roller 1 is disposed at the position located downwardly of a contact point 12 where the ink roller 1 comes in contact with the intermediate transferring medium 2 so that the circumferential surface of the ink roller 1 is flattened by thermal fusing. Then, the ink roller 1, of which rugged circumferential surface becomes flattened, is caused to rotate in the direction as identified by the arrow mark b in the drawing to build an image in the same manner as mentioned above.

Incidentally, as recording operations repeatedly performed, the outer diameter of the ink roller 1 decreases gradually and to compensate for reduction of the outer diameter of the ink roller 1 the latter is normally urged toward the intermediate transferring medium 2 under the effect of resilient force of a coil spring 1b. Further, the thermal flattening roller 8 is also urged toward the ink roller 1 under the effect of resilient force of a coil spring 8*a* to assure that it is normally brought into contact with the circumferential surface of the ink roller 1.

Next, structure of each of the components as shown in FIG. 1 will be described in more detail in the following.

First, the ink roller 1 is designed in a rotational configuration such as a cylinder, or the like, and at least its circumferential surface region is constituted by heat-transferable ink having a characteristic of supercoolability. As will be apparent from the drawing, the ink roller 1 is supported so as to rotate about the shaft 1a. The ink roller 1 may be molded only of heat-transferable ink in the rotational configuration. Alternatively, it may be so constructed that the ink layer is fitted around a core made of a metallic material, a resin or others.

Supercoolable heat-fusible ink constituting the ink roller 1 is prepared by uniformly dispersing coloring agent such as dye, pigment or the like into a heat-fusible binder having a characteristic of supercoolability. It should be noted that the supercoolable heat-fusible binder is such a binder that it is maintained still in the fused state for a predetermined period of time even at a temperature below its given melting point when it is heated at u temperature above the melting point to assume the fused state and thereafter it is cooled down from the fused state and this binder itself is known well. Further, a plurality of ink rollers constituted by supercoolable heat-fusible ink having several kinds of color tones may be used in order to carry out color recording. Incidentally, in the case where the binder does not exhibit a constant melting point, the terms "melting point" is replaced with other terms, such as "softening point determined in accordance with the ring and ball method".

Such a supercoolable heat-fusible binder as mentioned above can be obtained by mixing one, or two or more species of known supercoolable substances including plasticizers such as N-cyclohexyl-p-toluensulfonamide, N-ethyl-p-toluensulfonamide, benzotriazole, acetanilide and derivatives of these substances, within a conventional heat-fusible binder used in a conventional heat-transferable ink, e.g., a thermoplastic resin such as a polyamide resin, an acrylic resin, a polyvinyl acetate resin or a copolymer of these substances (having a softening point determined in accordance with the ring and ball method preferable in the range of 40° to 230° C., more preferably in the range of 50° to 200° C.) or natural or synthetic wax of various species.

For instance, 20 to 90 parts of supercoolable substance as mentioned above is mixed with 10 to 90 parts of heat-fusible binder as mentioned above on the basis of weight in order to obtain a supercoolable heat-fusible binder employable for practicing the illustrated embodiment of the present invention.

Further, it is possible to adjust supercoolability by adding only a substance or the like to it or adjust viscosity in the fused state, adhesiveness or the like by adding an elastomer or the like thereto.

As a coloring agent constituting supercoolable heat-fusible ink together with supercoolable heat-fusible binder as mentioned above, for instance, printing substances such as carbon black or the like or dyeing substances generally employed for practicing other recording methods can be used without fall. Incidentally, the dyeing substances are practically used singly or by mixing two or more kinds of them with one another. It is preferable that a content of coloring agent is determined in the range 1 to 40% on the basis of weight of the above-mentioned supercoolable heat-fusible ink.

The supercoolable heat-fusible ink constituted by a combination of supercoolable heat-fusible binder, coloring agent and other additive substances is so prepared that its melting point or softening point is determined preferably in the range of 40° to 200° C., more preferably in the range of 50° to 180° C. and time that elapses until solidification is initiated in the case where it is fused or softened by heating it at a temperature above its melting point or softening point and thereafter it is kept still at a room temperature (hereinafter referred to as "cooling time") is determined preferably in the range of 0.1 to 100 seconds, more preferably in the range of 0.1 to 50 seconds and most preferably in the range of 0.1 to 10 seconds.

When the melting point or softening point of the supercoolable heat-fusible ink is determined lower than 40° C., there take place such malfunctions as reduction of reservability of heat sensitive transferring material and contamination of the non-recorded area on the intermediate transferring medium 2. On the other hand, when it is determined higher than 200° C., it results that a huge amount of thermal energy is required for heating a pattern.

In the meanwhile, when supercooling time is determined shorter than 0.1 second, the image pattern is improperly held until the step of transferring it onto the recording sheet 6 is initiated after completion of the step of heating it. On the other hand, when supercooling time is determined longer than 100 seconds, a recorded image obtained after the image pattern is transferred onto the recording sheet 6 has a shortage in stability. Further, when the softened portion on the surface of the ink roller 1 fails to be solidified until it comes in contact with the intermediate transferring medium 2 again, this leads to contamination.

The ink roller 1 employable for practicing the illustrated embodiment of the present invention is produced by way of the steps of preparing heat-transferable ink by fusing and mixing supercoolable heat-fusible binder, coloring agent and additive substances with the aid of a dispersing unit such as atriter or the like and then molding it in the rotational configuration by pouring it into a molding die with a core fitted thereto as required.

When heating is effected by means of the recording head 3, such operational conditions are preferably employed that contact force appearing in the area between the ink roller 1 and the intermediate transferring medium 2 is determined lower than 2 $Kg/cm^2$ and a width of pulse to be applied is determined in the range of 0.5 to 5 milliseconds, as long as the recording head 3 is held in the contacted state where it heats the surface of the ink roller 1 in a required image pattern via the intermediate transferring medium 2. Further, it is also possible to effect recording on the recording sheet 6 in the so-called intermediate tone by varying a degree of heating with the use of the recording head 3 and thereby varying an amount of ink to be transferred onto the intermediate transferring medium 2.

Next, description will be made below as to the intermediate transferring medium 2. An endless belt made of hitherto known material can be used as an intermediate transferring medium, as long as it is found that it has sufficiently high strength, heat resistance and flexibility in view of repeated usage thereof. From the viewpoint of inhibiting an ink image on the intermediate transferring medium 2 from degrading its shape it is preferable that material having lower heat conductivity is employed for the intermediate transferring medium 2.

As material for the intermediate transferring medium 2, for instance, metallic foil made of metal such as aluminum , iron, copper or the like and alloys therefrom, and plastic film made of silicone resin, polyvinyl chloride resin, polyester resin, polyethylene resin, polypropylene resin, teflon resin or the like are preferably used and silicone rubber (particularly of the type which is vulcanized at room temperature) is more preferably used.

With respect to a thickness of the intermediate transferring medium 2 no limitation is placed thereon as long as it is provided in the form of an endless belt. In practice, it is preferable that it is determined in the range of 10 to 500 microns and it is more preferable that it is determined in the range of 20 to 100 microns.

Next, each of the rollers 2a, 2b and 2c and the pressure roller 7 may be an elastic roller of which surface is constituted by nitrile rubber, polyurethane rubber, natural rubber, ethylene-propylene rubber, polyvinyl chloride resin, nylon resin or the like or a solid roller of which surface is constituted by metal, ceramics or the like material.

Incidentally, the roller 7 is held upwardly with the aid of a coil spring 11 or the like member so that a certain pressure is imparted onto both the intermediate transferring medium 2 and the recording sheet 6 which are held between the roller 7 and the roller 2b. The pressure is determined preferably in the range of 0.05 to 10 Kg/cm and more preferably in the range of 0.1 to 5 Kg/cm in terms of line pressure. It should be noted that the pressure should be preferably determined at a higher level in order to assure that ink is satisfactorily adhered to the recess parts on the surface of the recording sheet 6 having poor surface flatness. It should be understood that the present invention should not be limited only to the illustrated embodiment. Alternatively, the roller 2b may be provided with spring means in order to allow the roller 2b to be urged toward the roller 7. Further, spring means may be bridged between a shaft of the roller 2b and a shaft of the roller 7 to generate pressure in the area located therebetween.

The distance as measured along the intermediate transferring medium 2 between the heating position 12 where heating is effected by the recording head 3 and the transferring position where the pressure roller 7 is disposed is so determined that the ink image 4 can be maintained in the fused state or in the softened state. Accordingly, there is no necessity for heating the ink image 4 again at the time when the ink image 4 which has been transferred onto the intermediate transferring medium 2 is transferred onto the recording sheet 6 again.

In the illustrated embodiment the thermal flattening roller 8 is so constructed that it comes directly in contact with the ink roller 1 a surface of which becomes rugged due to transferring operation and the whole contacted area is flattened by heating it to fuse or soften ink. However, the present invention should not be limited only to this. Alternatively, the thermal flattening roller 8 may be replaced with a flattening blade which is effective for scraping off a number of ruggedness on the surface of the ink roller 1.

Although the apparatus of the invention is constructed in the above-described manner, it further includes possibility of carrying out various kinds of intermediate treatments such as removal, modification or the like with respect to the ink image 4 as required which has been built by transference from the ink roller 1 onto the intermediate transferring medium 2. Now, as an example, description will be made as to the case where a removal sheet is utilized for the ink image 4 in the following.

The removal sheet 5 serves as a member for fully or partially removing the ink image 4 by absorption or adhesion of supercoolable heat-fusible ink which constitutes the ink image 4. A sheet of porous paper or porous plastic sheet which can remove supercoolable heat-fusible ink in the fused or softened state by absorption or adhesion is preferably employed for the removal sheet 5. Alternatively, other sheet material the surface of which has adhesiveness may be used for the same purpose.

The removal sheet 5 adequately carries out removal of the ink image 4 by absorption or adhesion of the ink image 4 on the intermediate transferring medium 2, for instance, when a removal roller 5a adapted to be displaced in the direction as identified by arrow marks d in the drawing with the aid of displacing means to be described later comes in contact with the intermediate transferring medium 2 while the removal roller 5a is rotated.

The distance between the recording head 3 and the removal roller 5a serving as intermediate treating means is so determined that the ink image 4 constituted by supercoolable heat-fusible ink is maintained in the required fused or softened state. In view of effective intermediate treatment such as removal of the ink image 4 with the use of the removal sheet 5, however, it is preferable that the distance as mentioned above is determined as short as possible, unless any particular problem takes place contrary to the intended object of the illustrated embodiment.

Figure 2:
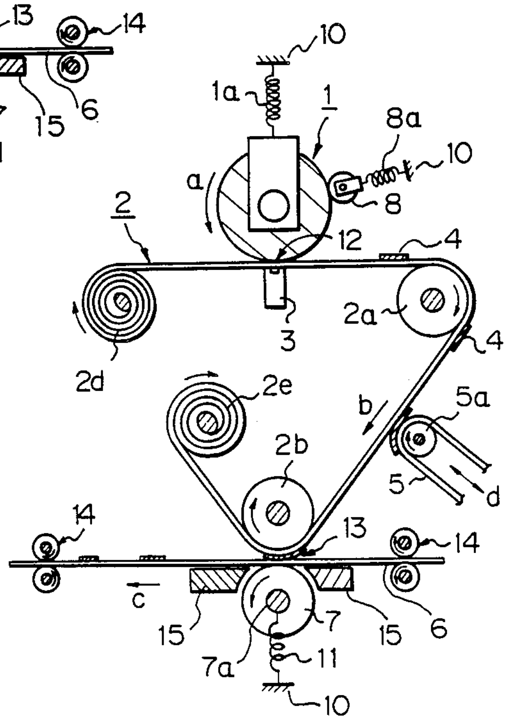
FIG. 2 is a schematic sectional view of an apparatus in accordance with a modified embodiment of the invention in which a winding type intermediate transferring medium is employed for the apparatus.

The foregoing embodiment has been described with respect to the case where the endless belt shaped intermediate transferring medium 2. As another embodiment, a winding type intermediate transferring medium 2 as shown in FIG. 2 can be employed for practicing the invention. Since the winding type intermediate transferring medium 2 is different from the intermediate transferring medium 2 in the foregoing embodiment only in respect of the shape as seen from the above in the drawings, it can be readily understood that this embodiment can be practiced in the same manner as the embodiment as shown in FIG. 1.

A material constituting the winding type intermediate transferring medium 2 is same as that in the embodiment which has bee described above with reference to FIG. 1 and moreover structures of other components is substantially same as those in the embodiment in FIG. 1. A difference between both the embodiments consists in that the intermediate transferring medium adapted to be circulated in the endless belt shaped manner in FIG. 1 is replaced with the winding type intermediate transferring medium 2 in FIG. 2 which is supplied from a supply roll 2d to be wound about a winding roll 2e.

Further, arrangement may be made in such a manner that when the intermediate transferring medium 2 is fully wound about the winding roll 2e, it is unwound therefrom to be wound about the supply roll 2d so that it is used again.

The foregoing embodiments have been described with respect to a typical thermal head including the recording head 3 which is heated in response to image information. Obviously, the present invention can be practiced even in the case where the thermal head is replaced with other heat sources such as a laser beam or the like.

Figure 3:
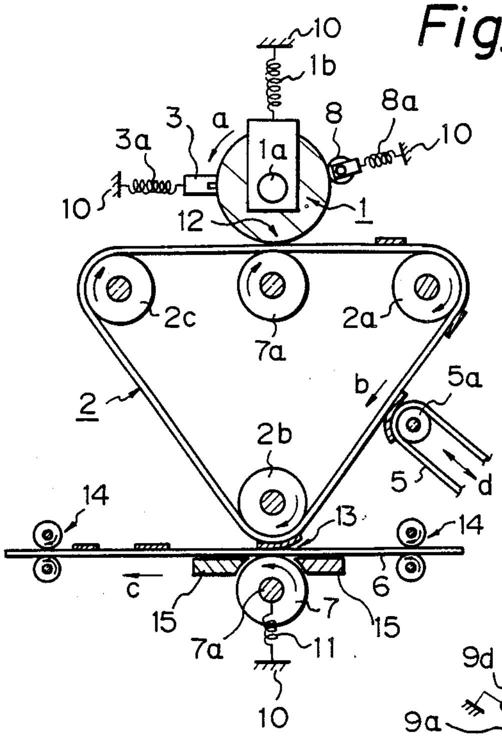
FIG. 3 is a schematic sectional view of an apparatus in accordance with other modified embodiment of the invention in which an ink roller is heated directly by means of a recording head.

Further, the foregoing embodiments have been described with respect to the case where heating is achieved by means of the recording head 3 via the intermediate transferring medium 2 when the circumferential surface of the ink roller 1 is heated in response to image information. However, the present invention may be practiced in accordance with another embodiment as shown in FIG. 3. In this embodiment, the recording head 3 comes directly in contact with the circumferential surface of the ink roller 1 and the latter is brought to line contact with the intermediate transferring medium 2 with the aid of a pressure roller 7*a* at the position located downwardly of the first-mentioned contact position as seen in the direction of rotation of the ink roller 1. Thus, the ink roller 1 is heated directly by the recording head 3 and ink which has been fused or softened by heating in that way is transferred onto the intermediate transferring medium 2. As is apparent from the drawing, the recording head 3 is normally urged toward the circumferential surface of the ink roller 1 under the effect of resilient force of a coil spring 3*a* whereby it is brought in contact with the ink roller 1 to heat the circumferential surface thereof irrespective of how outer diameter of the ink roller 1 is reduced.

Owing to the arrangement that the circumferential surface of the ink roller is heated directly, the intermediate transferring medium 2 can be designed to have a heavy thickness and thereby it becomes advantageous in terms of durability and cost. Further, since contact force given by the pressure roller 7*a* can be adjusted as required, fused or softened ink is transferred onto the intermediate transferring medium 2 without fail.

Incidentally, in this embodiment pressure with which the intermediate transferring medium 2 comes in contact with the ink roller 1 with the aid of the pressure roller 7*a* determined preferably in the range of 0.05 to 10 Kg/cm, more preferably in the range of 0.1 to 5 kg/cm in terms of line pressure.

The recording head 3 adapted to be heated in response to image information may be replaced with a combination of a plurality of recording electrodes in the form of needle-shaped or multistylus type electrodes and an electric conductive drum.

Figure 4:
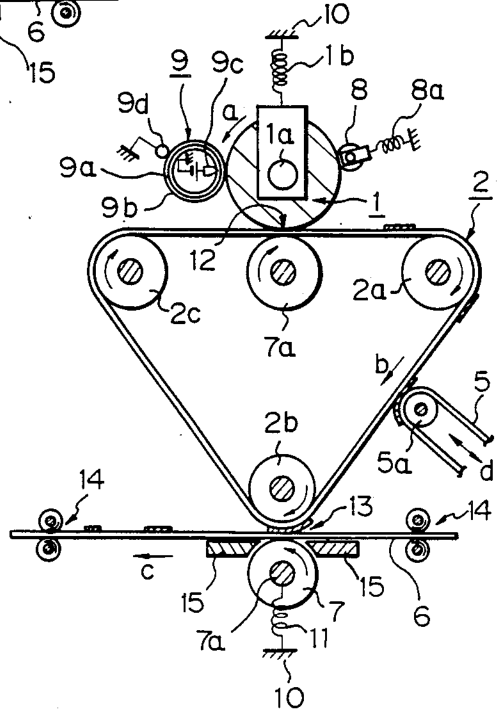
FIG. 4 is a schematic sectional view of an apparatus in accordance with other embodiment of the invention in which a recording electrode is used for the purpose of heating the rotatable transferring medium.

In the embodiment as shown in FIG. 4, the conductive drum 9 includes an electrically conductive resistor layer 9*a* and a metallic conductive layer 9*b* disposed on the former and a recording electrode 9*c* located opposite to the ink roller 1 with the conductive drum 9 interposed therebetween is brought into contact with the resistor layer 9*a*. The recording electrode 9*c* is electrically connected to the metallic conductive layer 9*b* via an electric power source while the metallic conductive layer 9*b* comes in contact with a return electrode 9*d*.

In the apparatus as shown in FIG. 4 the circumferential surface of the ink roller 1 is heated to build a certain image pattern under the effect of Joule's heat which is generated by the resistor layer 9*a* located below the recording electrode 9*c*. Since the apparatus is so constructed that recording electrode 9*c* does not come directly in contact with the circumferential surface of the ink roller 1, it results that the recording electrode 9*c* is less contaminated with foreign material and moreover the surface of the metallic conductive layer 9*b* can be easily cleaned. Thus, heat can be exactly applied to the circumferential surface of the ink roller 1. It should be noted that the apparatus as shown in FIG. 4 is substantially same as that as shown in FIG. 3 in structure with the exception of the above-described arrangement.

Next, another embodiment of the present invention in which a recording electrode is employed for the apparatus will be described below with reference to FIG. 5.

In this embodiment the ink roller 1 is produced in such a manner that a large number of electric conductive fine grains are uniformly distributed into components constituting the ink roller 1 and thereby the ink roller 1 becomes electrically conductive, and both the recording electrode 9*c* and a large area return electrode 9*e* are brought directly into contact with the circumferential surface of the ink roller 1. In practice, the apparatus is so constructed that a part of the circumferential surface of the conductive ink roller 1 located below the recording electrode generates heat in accordance with Joule's law with electric current supplied thereto and thereby it is fused or softened to build a certain image pattern. The apparatus as shown in FIG. 5 is substantially same as that as shown in FIG. 3 with the exception of the above-described arrangement.

Figure 5:
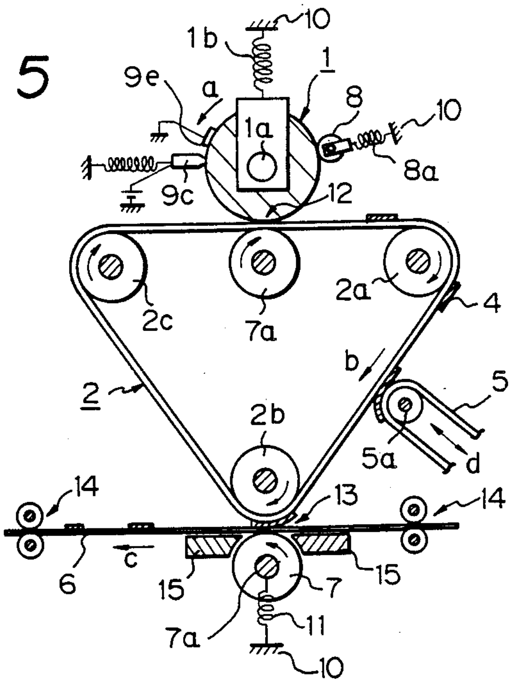
FIG. 5 is a schematic sectional view of an apparatus similar to FIG. 4 in which other type recording electrode is used for the purpose of heating the rotatable transferring medium.

Obviously, an intermediate transferring medium 2 which is designed in the winding type as shown in FIG. 2 can be used for the apparatus even in the case where the recording electrode as shown in FIGS. 4 and 5 is employed therefor.

A number of experiments for confirming reliability of transfer recording were conducted using the apparatus as shown in FIG. 1. The results of the experiments are as shown below.

EXPERIMENT 1

First, supercoolable heat-fusible ink was prepared in accordance with the following prescription.

| | |
|---|---|
| carbon black (Printex L, produced by Degussa A. B.) | 5 parts |
| polyamide resin (Sanmide #55, produced by Sanwa Chemical Co., Ltd.) | 80 parts |
| N—ethyl-p-toluenesulfonamide | 15 parts |

A supercoolable heat-fusible ink (having a melting temperature of 62° C. and a supercooling time of 10 seconds) was prepared by dispersing and mixing the components as noted above with one another while heating them at a temperature of 11° C. Then, the thus obtained supercoolable heat-fusible ink was molded in the cylindrical configuration having a diameter of 60 mm with a core made of resin and having a diameter of 10 mm disposed at the center thereof whereby an ink roller 1 was produced. A distance between the recording head 3 and the removal roller 5*a* was set to 3 cm, while a distance between the recording head 3 and the pressure roller 7 was set to 6 cm. The softened ink having a certain image pattern was then transferred onto the endless belt shaped intermediate transferring medium 2 made of silicone rubber sheet and having a thickness of 20 microns with the aid of the recording head 3 (having a width of pulse to be applied of 1.1 millisecond) by conducting heat to the ink roller 1 via the intermediate transferring medium 2 under the effect of surface pressure of 1 $kg/cm^2$.

When the ink image 4 reached the position where the removal roller 5*a* was disposed, a tape shaped removal sheet 5 made of blotting paper was brought in surface contact with the ink image 4 on the intermediate transferring medium 2 so that the ink image 4 constituted by softened supercoolable heat-fusible ink was separated away from the intermediate transferring medium 2. During the step of removal as mentioned above, the ink constituting the ink image 4 on the intermediate transferring medium 2 can be completely removed therefrom by determining the direction of movement of the removal sheet 5 opposite to the direction of movement of the intermediate transferring medium 2.

During the next step the ink image constituted by the softened supercoolable heat-fusible ink on the intermediate transferring medium 2 was transferred onto a recording paper 6 made of bond paper having a degree of flatness of 3 to 4 seconds as measured by an Oken type flatness meter while line pressure of 3 kg/cm was applied to the recording paper 6 with the aid of a combination of the roller 2*b* and the pressure roller 7.

As a result of the experiments conducted in that way it was found that a recorded image transferred onto the bond paper having a lower degree of flatness was visually recognized good in respect of recording density, transferability, sharpness or the like recording quality and obtained the substantially same recording quality as in the case where transferring is achieved onto a highly flat paper having a degree of flatness of about 120 seconds, without any occurrence of such a malfunction that a part of ink which failed to be removed by the removal sheet 5 was transferred onto the recording paper 6.

Further, it was found that a good image was obtained with lower line pressure of 1 kg/cm appearing in the area between the roller 2 and the pressure roller 7, when transferring was effected onto a highly flat paper having a degree of flatness of about 120 seconds.

Further, it was found that an amount of transference of supercoolable heat-fusible ink onto the recording sheet 6 varied in dependence on variation of a width of pulse to be applied to the recording head 3 and thereby a recording image having an intermediate tone could be obtained on a highly flat paper, bond paper or the like.

EXPERIMENT 2

A number of experiments for confirming reliability of transference recording were conducted in the same manner as in the case of Experiments 1 using the apparatus as shown in FIG. 3 under the operational conditions that the intermediate transferring medium 2 made of silicone rubber had a thickness of 100 microns and line pressure of 1 kg/cm was applied thereto by means of the pressure roller 7*a* and the substantially same results as those of Experiments 1 were obtained.

As described above, the apparatus of the invention is so constructed that the circumferential surface of a transferring medium is heated in response to image information, heated ink is transferred onto an intermediate transferring medium and the thus transferred ink is transferred further onto a recording medium. Owing to compact construction made for the apparatus in that way there is no necessity for any expensive ink ribbon which has been hitherto used for conventional apparatuses, resulting in running cost being reduced remarkably. Further, since reheating is not required when retransfer is effected from the intermediate transferring medium onto the recording medium, no excessive load is imposed on a recording head and other components. Moreover, since a properly determined intensity of pressure is imparted to the recording medium when transfer is effected onto the recording medium, it is possible to adhere transferring medium to recessed portion on the surface of the recording medium. As a result, a high quality of recorded image can be obtained even when a recording medium of which surface has a lower degree of flatness is used for recording operation.

Another advantageous feature of the invention is that recording can be achieved in intermediate tones by directly and finely controlling the heating condition for the transferring medium to adjust a amount of transference of the transferring medium.

Further, it is possible to carry out various kind of intermediate treatment for a recording image on the intermediate transferring medium. It should be noted that even when intermediate treatment is carried out, a very clear recorded image having the quite same quality as that of untreated recorded image can be built on the recording medium.

Next, another embodiment of the present invention will be described below with reference to FIG. 6.

In this embodiment the circumferential surface of a transferring medium is heated and flattened at the position located upstream of the position where the transferring medium comes in contact with an intermediate transferring medium and the thus flattened surface of the transferring medium is then heated to build an image pattern. Thereafter, the fused or softened transferring medium is transferred onto the intermediate transferring medium. The transferring medium which has been transferred onto the intermediate transferring medium in that way is retransferred onto a recording medium while it is kept in the fused or softened state whereby required transference recording is achieved.

Figure 6:
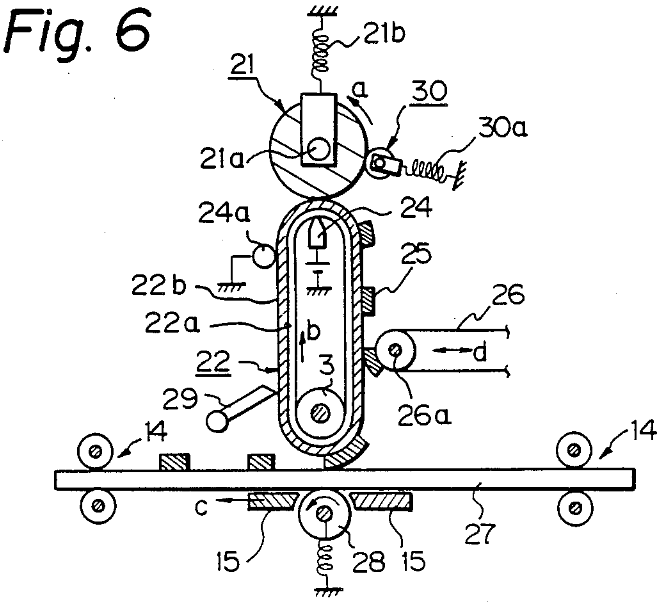
FIG. 6 is a schematic sectional view of an apparatus in accordance with another embodiment of the invention in which an endless belt shaped electric conductive intermediate transferring medium is employed for the apparatus.

FIG. 6 is a schematic sectional view of the apparatus in which an endless belt shaped intermediate transferring medium is used therefor. In the drawing reference numeral 21 designates an ink roller serving as a transferring medium. Specifically, the ink roller 21 is constituted by solidified ink which has supercoolable heat-fusibility and it is resiliently supported with the aid of a coil spring 21*b* so as to rotate about shafts 21*a* which are projected outwardly of both the side walls thereof. Thus, it is continuously or intermittently rotated about the shafts 21*a* in the direction as identified by an arrow mark a in the drawing in response to recording operation to be performed.

Reference numeral 22 designates an endless belt shaped intermediate transferring medium having electrical conductivity. As is apparent from the drawing, the intermediate transferring medium 22 is disposed below the rotatable ink roller 21 so that it is extended around a roller 23 while it is held between the ink roller 21 and a recording electrode 24. As the ink roller 21 is rotated, the intermediate transference medium 22 is circulated in the direction as identified by an arrow mark b in the drawing while the one surface thereof is brought in contact with the circumferential surface of the ink roller 21 at the position where the intermediate transferring medium 22 is held between the ink roller 21 and the recording electrode 24. During circulation of the intermediate transferring medium 22, a certain intensity of voltage is applied from the recording electrode 24 to the electric conductive intermediate transferring medium 22 in response to image information so that electric current is caused to flow from the recording electrode 24 to a return electrode 24*a* via an electric conductive layer 22*a* and a metallic conductive layer 22*b* both of which constitutes the intermediate transferring medium 22, causing the conductive layer 22*a* located above the recording electrode 24 to be heated in accordance with Joule's law to build an image pattern.

Heat-fusible ink in the ink roller 21 which is fused or softened by heating is then transferred onto the intermediate transferring medium 22 whereby an ink image 25 is built on the intermediate transferring medium 22. While the ink image 25 is maintained in the fused or softened state for a predetermined period of time after completion of transference due to the fact that it is constituted by supercoolable heat-fusible ink, it is displaced in the direction as identified by an arrow mark b in the drawing as the intermediate transferring medium 22 is circulated.

During displacing of the ink image 25 in the above-described manner various kind of intermediate treatment can be carried out for the ink image 25 which has been built on the intermediate transferring medium 22, as required. For instance, full removal or partial removal (modification) of the ink image 25 can be achieved by allowing a removal sheet 26 made of tacky material or the like to come in contact with the ink image 25 on the intermediate transferring medium 22.

In the meanwhile, a recording sheet 27 serving as recording medium is transported in the direction as identified by an arrow mark c in the drawing in synchronization with rotation of the ink roller 21 and circulation of the intermediate transferring medium 22 with the aid of pairs of transporting rollers 14 and a guide 15 so that the part of the surface of the intermediate transferring medium 22 onto which the ink image 25 is adhered comes in contact with the recording sheet 27 at the position where a pressure roller 28 is disposed below the recording sheet 27. At this moment a certain intensity of pressure is imparted to the recording sheet 27 in the area between the pressure roller 28 and the roller 23 whereby the ink image 25 kept in the fused or softened state is retransferred onto the recording sheet 27. Thus, image recording is achieved on the recording sheet 27 in response to image information.

If necessary, cleaning means 29 in the form of a blade may be disposed at the position located downstream of the pressure roller 28 as seen in the direction of movement of the intermediate transferring medium 22 in order to clean the intermediate transferring medium 22 after the ink image 25 has been transferred onto the recording sheet 27.

On the other hand, after completion of ink onto the intermediate transferring medium 22 the ink roller 21 is formed with a number of fine ruggedness on the circumferential surface thereof. To eliminate them a thermal flattening roller 30 is brought in contact with the circumferential surface of the ink roller 21 under the effect of resilient force of a coil spring 30*a* at the position located downstream of the contact area between the ink roller 21 and the intermediate transferring medium 22 as seen in the direction of rotation of the ink roller 21 so that the circumferential surface of the ink roller 21 is flattened by fusing under the influence of heat. Then, the flattened ink roller 1 is rotated in the direction as identified by an arrow mark a in the drawing to repeatedly effect image building in the same manner as mentioned above.

Obviously, the diameter of the ink roller 21 is gradually reduced as transference recording continues. However, both the springs 21*b* and 30*a* assure that the ink roller 21 is normally brought in contact with the intermediate transferring medium 22 and the thermal flattening roller 30 is normally brought in contact with the ink roller 21 irrespective of how the diameter of the ink roller 21 decreases, because the ink roller 21 is biased toward the intermediate transferring medium 22 by means of the spring 21*b* and the thermal flattening roller 30 is biased toward the ink roller 21 by means of the spring 30*a*.

Since the ink roller 21 is constituted by using the same materials in the same manner as in the foregoing embodiments, repeated description will not be required. Next, the electric conductive intermediate transferring medium 22 is constituted in such a manner that a metallic conductive layer 22*b* is deposited on an electric conductive layer 22*a* in the form of an electric conductive sheet.

It should be noted that the electric conductive sheet can be easily obtained by way of the steps of uniformly dispersing a large number of electric conductive fine grains such as carbon black, titanium black, pulverized metal, $SnO_2$ or the like into conventional film material such as polyester resins, fluorine resins, polycarbonate resins, triacetyl cellulose resins, nylon resin, polyamide resins or the like each of which has comparatively high heat resistibility and then molding the thus prepared mixture to the shape of film. Specific resistance of the conductive layer 2*a* is determined in the range of 10 to $10^4$ ohm-cm, preferably in the range of 10 to $10^3$ ohm-cm by properly adjusting an amount of content of the electric conductive grains in the conductive sheet.

The conductive layer 22*a* has a thickness in the range of 2 to 500 microns, preferably in the range of 5 to 500 microns.

The conductive layer 22*a* is lined with a metallic conductive layer 22*b* over the whole outer surface thereof which has an electric conductivity higher than that of the conductive layer 22*a*. A certain intensity of voltage is applied to the conductive layer 22*a* in response to image information while the latter is interposed between the recording electrode 24 and the conductive layer 22*b* so that heat is generated within a pattern shaped area in accordance with Joule's law.

The metallic conductive layer 22*b* is prepared in the form of a film having a thickness preferably in the range of 0.01 to 0.3 micron by adhesively securing to the conductive layer 22*a* metallic foil made of aluminum, copper or the like metallic material or by forming a metallic film over the conductive layer 22*a* in accordance with the process of plating, depositing or the like. Conversely, the conductive layer 22*a* may be formed on the metallic conductive layer 22*b* comprising metallic film or foil by the process of coating, extrusion laminating or the like.

In the embodiment as shown in FIG. 6 the intermediate transferring medium 22 constituted by a combination of the conductive layer 22*a* and the metallic conductive layer 22*b* is designed in the form of an endless belt. However, the present invention should not be limited only to this. It may be designed in another type where it can be used repeatedly. Although it is not shown in any one of the drawings, it may be designed in the tubular form in such a manner that it is unwound from a supply roll and wound about a winding roll and after completion of unwinding the step of operation reverse to the foregoing one is performed.

The recording electrode 24 which serves to apply a predetermined intensity of voltage to the electric conductive intermediate transferring medium 22 is prepared in the conventional manner, for instance, in the form of needle shaped electrode, multistylus shaped electrode or the like.

Further, the recording electrode 24 is preferably used under the recording condition that a pulse to be applied thereto has a width in the range of 0.5 to 5 milliseconds.

It is possible to effect recording in the so-called intermediate tone by controlling the A return electrode 24*a* which comes in contact with the metallic conductive layer 22*b* of the intermediate transferring medium 22 is so designed that contact is established without any occurrence of injury or damage on the conductive layer 22*b*. For instance, a roll shaped electrode as shown in FIG. 6 is preferably employed for the return electrode 24*a*.

Next, each of the roller 23 and the pressure roller 28 may be either an elastic roller of which surface is constituted by nitrile rubber, polyurethane rubber, natural rubber, ethylene propylene rubber, polyvinyl chloride rubber, nylon rubber or the like material or a solid roller of which surface is constituted by metal, ceramic or the like solid material.

To inhibit the recording electrode 24 from being effected by excessive pressure loads, contact force appearing in the area between the ink roller 21 and the intermediate transferring medium 22 under the effect of resilient force of the spring 21*b* is preferably determined in the range of 0.1 to 2 kg/cm$^2$ in terms of surface pressure. Further, pressure appearing in the area between the roller 23 and the pressure roller 28 is preferably determined in the range of 0.05 to 10 kg/cm in terms of line pressure in order to assure that heat-fusible ink can be satisfactorily adhered to recessed parts on the surface of the recording sheet 27.

Next, the blade 29 is a member for removing residual ink on the intermediate transferring medium 22 which is adhesively existent thereon without transference onto the recording sheet 27. It is preferably designed in the form of a knife shaped or brush shaped member made of metal or resin which is effective for removing residual ink by scraping operation.

For the purpose of removing residual ink the blade 29 may be replaced with a conventional adhesive tape which comes in contact with the intermediate transferring medium 22 or in the case where supercoolable heat-fusible binder is used, it may be replaced with conventional blotting paper which comes in contact with the intermediate transferring medium 22. Thus, residual ink can be removed by adhesion or adsorption.

The thermal flattening roller 30 is a member for flattening the rugged circumferential surface of the ink roller 21 by heating it to some extent. It should be noted that the circumferential surface of the ink roller 21 becomes rugged during the step of transferring ink from the ink roller 21 onto the intermediate transferring medium 22. Alternatively, the thermal flattening roller 21 may be replaced with a blade or the like member which is effective for scraping off the rugged part of the circumferential surface of the ink roller.

Next, description will be described below as to intermediate treating or processing to be effected for the ink image 25 on the intermediate transferring medium 22, as required. This intermediate treating for the ink image can be achieved in various manner in the form of addition of another ink image, removal of a part of the existent ink image, partial modification of the latter or the like. Now, description will be made below as to one example of intermediate treating means which serves as a removal sheet 26 for carrying out full or partial removal of an ink image on the intermediate transferring medium 22. It should be noted that another ink roller 21 is additionally provided in the case where another ink image is to be added.

The removal sheet 26 is a member for carrying out full or partial removal of the ink image by absorption or adhesion of supercoolable heat-fusible ink constituting the ink image. As material for the removal sheet 26, a sheet material to which the ink is absorbed or adhered or in the fused or softened state, for instance, conventional adhesive tape is employed therefor. Alternatively, sheet shaped porous paper, porous plastic sheet or the like may be employed for the purpose of absorption or adhesion of the ink.

In practice, the removal sheet 26 is utilized in such a manner that it is brought in contact with the intermediate transferring medium 2 by displacement of a removal roller 26*a* in the forward direction as identified by an arrow mark in the drawing with the aid of displacing means to be described later while the removal roller 26*a* is rotated and the ink image on the intermediate transferring medium 22 is then transferred onto the removal sheet 26 by absorption or adhesion. In addition to removal of the ink image as mentioned above, another intermediate treatment such as addition of another ink image, modification of the existent ink image by oozing of the ink or the like can be carried out on the intermediate transferring medium 22.

The distance as measured between the recording electrode 24 and the removal roller 26*a* serving as intermediate treating means is so determined that the ink image constituted by supercoolable heat-fusible ink can be maintained in the required fused or softened state. To assure that intermediate treatment such as removal of the ink image or the like is effectively achieved by means of the removal sheet 26, the above-mentioned distance is preferably determined as short as possible, unless any particular problem occurs contrary to the intended object of the present invention.

Incidentally, the endless belt shaped intermediate transferring medium 22 constructed by a combination of the conductive layer 24*a* and the metallic conductive layer 24*b* has been exemplified in that way. Alternatively, an intermediate transferring medium constructed only by a conductive sheet may be employed for practicing the embodiment of the invention. In this case the return electrode 24*a* is designed to have an area larger than that of the recording electrode 24. This leads to a result that the conductive sheet located just above the recording electrode 24 through which a high density of electric current flows is heated in accordance with Joule's law in response to image information when electric current flows from the recording electrode 24*a* to the return electrode 24*a* via the conductive sheet while the return electrode 24*a* comes in contact with the conductive sheet whereby the circumferential surface of the ink roller 21 which comes in contact with the outer surface of the intermediate transferring medium 22 is fused or softened within an area as defined by the image pattern. Accordingly, no metallic conductive layer is required.

A number of experiments relative to transference recording were conducted by using the apparatus as shown in FIG. 6. The results of the experiments will be shown below.

Supercoolable heat-fusible ink was prepared in accordance with the same prescription as that in the foregoing embodiment.

An endless belt shaped electric conductive intermediate transferring medium 22 comprising a conductive layer 22*a* constructed by polycarbonate resin with carbon black uniformly dispersed therein and having a specific resistance of 100 ohm-cm and a thickness of 7 microns and a metallic conductive layer 24*b* constituted by a layer of vacuum deposited aluminum having a thickness of 0.1 micron was used for the apparatus.

Next, a required intensity of voltage was applied in response to image information from the side of the conductive layer 24*a* of the intermediate transferring medium 22 using the recording electrode 24 (of which pulse to be applied had a width of 0.7 millisecond) whereby softened heat-fusible ink having a specific image pattern was transferred onto the metallic conductive layer 22*b*. The thus transferred ink image 25 on the intermediate transferring medium 22 was then transferred to a bond paper the degree of flatness of which amounted to 3 to 4 seconds as measured by means of an Oken type flatness meter while pressure of 3 kg/cm in terms of line pressure was imparted thereto with the aid of a combination of the roller 23 and the roller 28.

It was found that the recorded image which had been transferred onto the bond paper having a lower degree of flatness was visually good in respect of properties of recording density, transferability and sharpness and had the substantially same quality of recording as in the case where transferring was effected onto a highly flat paper which had a degree of flatness of about 120 seconds as measured by the same process as mentioned above.

Further, it was found that an amount of transference of supercoolable heat-fusible ink onto the recording sheet 24 varied in dependence on variation of a width of pulse to be applied to the recording head 23 and thereby a recorded image having an intermediate tone could be obtained on the highly flat paper as well as the bond paper.

As will be readily apparent from the above description, the apparatus according to the embodiment of the invention is so constructed that a certain intensity of voltage is applied to an electric conductive intermediate transferring medium to heat the latter within an area as defined by an image pattern, thus generated heat is transmitted directly to a transferring medium so as to allow a part of the transferring medium to be transferred to the intermediate transferring medium and the transferring medium which has been transferred onto the intermediate transferring medium in that way is retransferred onto a recording medium. Owing to construction of the apparatus as mentioned above there is no necessity for any expensive ink ribbon which has been hitherto used while operating a conventional compact transference recording apparatus. Further, an expensive electric conductive material can be used repeatedly while advantageous features of higher recording speed and higher thermal efficiency inherent to the recording electrode system are maintained, resulting in the running cost of the apparatus being reduced remarkably. Another advantageous feature of the apparatus is that recording can be achieved in an intermediate tone by directly and finely controlling the heating condition for the transferring medium and thereby adjusting an amount of transference of the transferring medium.

Further, since no reheating is required when the transferring medium is retransferred from the intermediate transferring medium onto the recording medium, excessively high load is not imparted to the recording head and other components. Moreover, it is possible to adhere the transferring medium to the recessed parts on the surface of the recording medium by properly controlling an intensity of pressure at the time when retransferring is effected. As a result, a high quality of transferred recording image can be obtained even when recording medium of which surface has a lower degree of flatness is used for the apparatus.

The apparatus of the invention makes it possible to carry out various kind of intermediate treatment for a recording image on the intermediate transferring medium as required, before the recorded image is transferred onto the recording medium. It is found that even when intermediate treatment is carried out in that way, a very clear recorded image having the same quality as in the case where the recorded image on the intermediate transferring medium is not subjected to intermediate treating.

Next, description will be made below as to removal sheet displacing means and a pressure adjusting mechanism for the pressure roller both of which are employable for each of the above-mentioned embodiments of the invention.

Figure 7:
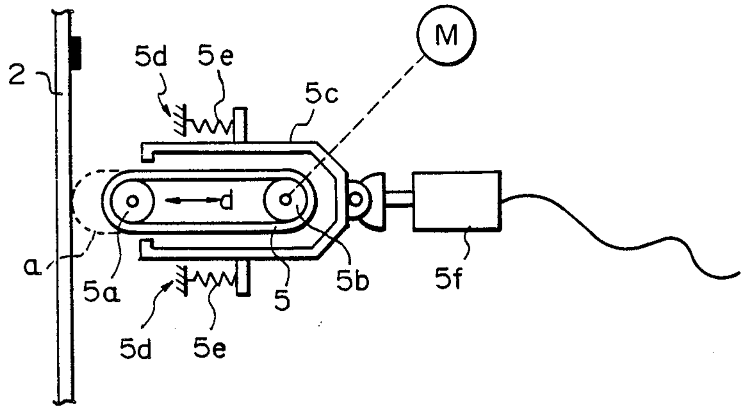
FIG. 7 is a schematic side view of removal sheet displacing means.

First, an example of the removal sheet displacing means will be described below with reference to FIG. 7.

Rollers 5*a* and 5*b* are disposed in a frame 5*c* and a removal sheet 5 is spanned between both the rollers 5*a* and 5*c*. As is apparent from the drawing, the frame 5*c* is normally urged in the direction away from the intermediate transferring medium 2 under the effect of resilient force of springs 5*e* which are disposed between plates on the frame 5*c* and a stationary plate 5*d* of the housing of the apparatus. Accordingly, while the removal sheet 5 is kept in the inoperative state, it is away from the intermediate transferring medium 2 without any occurrence of removal of the ink image on the intermediate transferring medium 2. When a correction button (not shown) is depressed by an operator or in accordance with a command transmitted from the control section (not shown), a plunger 5*f* is activated and thereby the frame 5*c* is displaced toward the intermediate transferring medium 2 against resilient force of the springs 5*e*. Thus, when correcting is effected, the removal sheet 5 is brought in contact with the intermediate transferring medium 2 (as represented by a dotted line a) whereby an incorrectly transferred ink image can be removed from the intermediate transferring medium 2.

Incidentally, in the drawing reference letter M designates a motor which serves to circulate the removal sheet 5 during correcting operation.

Figure 8:
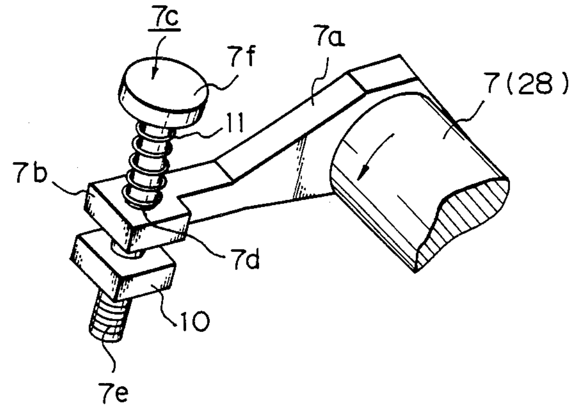
FIG. 8 is a perspective view of a pressure adjusting mechanism usable for a pressure roller.

Next, the pressure adjusting mechanism for the pressure roller will be described below with reference to FIG. 8. It should be noted that FIG. 8 is a perspective view which schematically illustrates the structure of the pressure adjusting mechanism.

As shown in the drawings, the pressure roller 7 (28) is rotatably supported by means of a support arm 7*a*. The support arm 7*a* is formed with a platform 7*b* at the free end thereof so that a bolt 7*c* with a coil spring 11 loosely wound thereabout is inserted through a hole 7*d* on the platform 7*b*. A male threaded portion 7*e* on the lower part of the bolt 7*c* is threadably engaged with the female threaded portion of the housing 10 (only a part of the latter is shown in the drawing).

As the bolt 7*c* is displaced upwardly or downwardly by rotating the bolt 7*c*, an amount of resilient displacement of the spring 11 located between a head 7*f* of the bolt 7*c* and the platform 11 varies. This means that the spring load exerted on the support arm 7*a* varies.

Thus, pressure to be imparted to the pressure roller 7 (28) can be properly adjusted as required by rotating the bolt 7*c*.

As will be readily apparent from the above description, the present invention assures that a high quality of image is recorded even on a recording medium of which surface has a lower degree of flatness.

While the present invention has been described above with respect to a few preferred embodiments thereof, it should of course be understood that it should not be limited only to them but various changes or modifications may be made in any acceptable manner without departure from the spirit and scope of the invention as defined by the appended claims.

What is claimed is:

1. A method of recording an image on a recording medium by image transference comprising the steps of:
 - fusing or softening supercoolable heat-transferable ink,
 - selectively transferring the thus fused or softened supercoolable heat-transferable ink onto an intermediate transferring medium in accordance with image information to achieve a first transferring step,
 - transferring under pressure onto the recording medium the supercoolable heat-transferable ink which had been transferred onto the intermediate transferring medium to achieve a second transferring step, and
 - flattening the surface of the remaining supercoolable heat-transferable ink after completion of said first transferring step.

2. A method as defined in claim 1, wherein the heat-transferable ink has a supercooling time in the range of 0.1 to 100 seconds.

3. A method as defined in claim 1, wherein the heat-transferable ink has a melting point or softening point in the range of 40° to 200° C.

4. A method of recording an image on a recording medium by image transference, comprising the steps of:
 - flattening the circumferential surface of a rotatable supercoolable heat-transferable ink roller to come into contact with one surface of an electrically conductive intermediate transferring medium so that the supercoolable heat-transferable ink is selectively transferred onto said intermediate transferring medium in accordance with image information by applying a voltage having a predetermined intensity in response to the image information to the opposite surface of the intermediate transferring medium in the area where the supercoolable heat-transferable ink roller comes into contact with the intermediate transferring medium, and
 - transferring under pressure onto the recording medium the supercoolable heat-transferable ink which had been transferred onto the intermediate transferring medium.

5. A method as defined in claim 4, wherein the heat-transferable ink has a supercooling time in the range of 0.1 to 100 seconds.

6. A method as defined in claim 4, wherein the heat-transferable ink has a melting point or softening point in the range of 40° to 200° C.

7. An apparatus for recording an image on a recording medium by image transference, the apparatus comprising:
 - a rotatable transferring medium having supercoolable heat transferable ink,
 - means for fusing or softening said supercoolable heat-transferable ink in response to image information,
 - first transferring means for selectively transferring the thus fused or softened supercoolable heat-transferable ink onto an intermediate transferring medium in accordance with the image formation,
 - second transferring means for transferring under pressure onto the recording medium the supercoolable heat-transferable ink which had been transferred onto said intermediate transferring medium, and
 - flattening means for flattening the surface of the remaining supercoolable heat-transferable ink after completion of transference onto said intermediate transferring medium.

8. An apparatus as defined in claim 7, wherein the heat-transferable ink has a supercooling time in the range of 0.1 to 100 seconds.

9. An apparatus as defined in claim 7, wherein the heat-transferable ink has a melting point or softening point in the range of 40° to 200° C.

10. A method as defined in claim 1, wherein said fusing or softening step and said first transferring step are effected at substantially the same time.

11. A method as defined in claim 1, wherein said fusing or softened step and said first transferring step are effected at different times.

12. A method as defined in claim 1, wherein the heat-transferable ink is a cylindrical body the diameter of which decreases with successive said first transferring steps.

13. A method as defined in claim 12, wherein the cylindrical body has shafts at both ends for rotatably supporting the heat-transferable ink.

14. A method as defined in claim 12, wherein the cylindrical body comprises a circular cylindrical core having a layer of heat-transferable ink disposed on the circumferential surface thereof.

15. A method as defined in claim 4, wherein the heat transferable ink is a cylindrical body the diameter of which decreases as the heat-transferable ink is transferred onto the intermediate transfer medium.

16. A method as defined in claim 15, wherein the cylindrical body has shafts at both ends for rotatably supporting the heat-transferable ink.

17. A method as defined in claim 15, wherein the cylindrical body comprises a circular cylindrical core having a layer of heat-transferable ink disposed on the circumferential surface thereof.

18. An apparatus as defined in claim 7, wherein said means for fusing or softening and said first transferring means comprise a single recording head.

19. An apparatus as defined in claim 7, wherein said means for fusing or softening includes a recording head and said first transferring means is separate from said recording head.

20. An apparatus as defined in claim 7, wherein said rotatable transferring medium is a cylindrical body the diameter of which decreases as the heat-transferable ink is transferred onto said intermediate transfer medium.

21. An apparatus as defined in claim 20, wherein said cylindrical body has shafts at both ends for rotatably supporting said rotatable transferring medium.

22. An apparatus as defined in claim 20, wherein said cylindrical body comprises a circular cylindrical core having a layer of heat-transferable ink disposed on the circumferential surface thereof.

* * * * *